US009223754B2

(12) United States Patent
Belsky et al.

(10) Patent No.: US 9,223,754 B2
(45) Date of Patent: Dec. 29, 2015

(54) CO-SIMULATION PROCEDURES USING FULL DERIVATIVES OF OUTPUT VARIABLES

(75) Inventors: Vladimir Belsky, Mansfield, MA (US); Bruce Edward Engelmann, East Greenwich, RI (US); Hilding Elmqvist, Lund (SE); Hans Roland Olsson, Lund (SE)

(73) Assignee: Dassault Systèmes, S.A., Velizy Villacoublay (FR)

( * ) Notice: Subject to any disclaimer, the term of this patent is extended or adjusted under 35 U.S.C. 154(b) by 361 days.

(21) Appl. No.: 13/538,343

(22) Filed: Jun. 29, 2012

(65) Prior Publication Data
US 2014/0005989 A1   Jan. 2, 2014

(51) Int. Cl.
*G06F 17/50* (2006.01)
*G06F 17/13* (2006.01)

(52) U.S. Cl.
CPC ............ *G06F 17/13* (2013.01); *G06F 17/5009* (2013.01); *G06F 2217/16* (2013.01)

(58) Field of Classification Search
USPC .......................................................... 703/2, 6
See application file for complete search history.

(56) References Cited

U.S. PATENT DOCUMENTS

| | | | | |
|---|---|---|---|---|
| 4,918,643 A * | 4/1990 | Wong | ............................... | 703/4 |
| 5,629,845 A * | 5/1997 | Liniger | ........................... | 700/67 |
| 7,548,840 B2 * | 6/2009 | Saaf | ................................. | 703/10 |
| 7,626,534 B1 * | 12/2009 | Boka et al. | ....................... | 342/90 |
| 2004/0165781 A1 * | 8/2004 | Sun | ................................. | 382/236 |
| 2009/0259447 A1 * | 10/2009 | Langemyr et al. | ................. | 703/2 |
| 2009/0294122 A1 * | 12/2009 | Hansen et al. | ........... | 166/250.01 |
| 2009/0299929 A1 * | 12/2009 | Kozma et al. | .................... | 706/25 |
| 2011/0191072 A1 * | 8/2011 | Borrvall | ........................... | 703/2 |
| 2011/0307438 A1 * | 12/2011 | Fernandez Martinez | ....... | 706/52 |
| 2013/0116986 A1 * | 5/2013 | Zhang et al. | ....................... | 703/2 |
| 2013/0144578 A1 * | 6/2013 | Steffes-Lai et al. | ............... | 703/2 |
| 2013/0246015 A1 * | 9/2013 | Dong et al. | ........................ | 703/2 |

OTHER PUBLICATIONS

Bastian, J., et al., *Master for Co-Simulation Using FMI*, Proceedings of Conference Modelica 2011, Mar. 20-22, 2011, Dresden, Germany, Mar. 20, 2011, XP055083500, Retrieved from the Internet: URL:https://www.modelica.org/events/modelica2011/Proceedings/pages/papers/05_2_ID_16_5_a_fv.pdf (retrieved on Oct. 10, 2013).
ITEA2: *Functional Mock-Up Interface for Model Exchange and Co-Simulation v2.0 Beta3*, Output document of ITEA2 project Modelisar, Nov. 14, 2011, XP055083479, Retrieved from the Internet: URL:https://svn.fmi-standard.org/fmi/branches/public/specifications/FMI_for_ModelExchange_and_CoSimulation_v2.0_Beta3.pdf (retrieved on Oct. 10, 2013).

(Continued)

*Primary Examiner* — Thai Phan
(74) *Attorney, Agent, or Firm* — Hamilton, Brook, Smith & Reynolds, P.C.

(57) ABSTRACT

A computer-implemented method for use in simulating dynamic behavior of complex engineering systems comprised of several subsystems includes computing a Jacobian matrix based on output derivatives, wherein the output derivatives are based on corresponding state variable derivatives related to corresponding first input variables for each of a plurality of subsystems. The method also includes modifying the first input variables and computing second input variables and residuals for each of the plurality of subsystems based on corresponding state variable derivatives.

20 Claims, 3 Drawing Sheets

(56) References Cited

OTHER PUBLICATIONS

Blochwitz, T., et al., *The Functional Mockup Interface for Tool Independent Exchange of Simulation Models*, Proceedings of Conference Modelica 2011, Mar. 20-22, 2011, Dresden, Germany, Mar. 20, 2011, XP055083443, Retrieved from the Internet: URL:https://www.modelica.org/events/modelica2011/Proceedings/pages/papers/05_1_ID_173_a_fv.pdf (retrieved on Oct. 10, 2013).

Blochwitz, T., et al., *Functional Mockup Interface 2.0: The Standard for Tool Independence Exchange of Simulation Models*, Proceedings of Conference Modelica 2012, Sep. 3-5, 2012, Munich, Germany, Sep. 3, 2012, pp. 173-184, XP055083442, Retrieved from the Internet: URL:https://svn.fmi-standard.org/fmi/branches/public/docs/Modelica2012/ecp12076173_BlochwitzOtter.pdf (retrieved on Oct. 10, 2013).

Sicklinger S., et al., *Interface-Jacobian Based Co-Simulation*, Abstract of Presentation at the NWC 2013 Conference, Jun. 9-12, 2013, Salzburg, Austria, Jun. 9, 2013, XP055083466, Retrieved from the Internet: URL:http://www.nafems.org/downloads/nwc13/abstracts/344_Sicklinger.pdf (retrieved on Oct. 10, 2013).

Sicklinger, S., et al., *Interface-Jacobian Based Co-Simulation*, Abstract of Presentation at the Coupled Problems 2013 Conference, Jun. 17-18, 2013, Sta. Eulalia, Ibiza, Spain, Jun. 17, 2013, XP055083472, Retrieved from the Internet: URL:http://congress.cimne.com/coupled2013/proceedings/pdfs/a869.pdf (retrieved on Oct. 10, 2013).

European Search Report and Written Opinion in Application No. EP 13 17 3462, dated Oct. 10, 2013.

Arnold, M., "Numerical stabilization of co-simulation techniques The ODE case," Martin Luther University Halle-Wittenberg NWF II—Institute of Mathematics (Sep. 5, 2011).

Kübler, R., et al., "Two Methods of Simulator Coupling," *Mathematical and Computer Modeling of Dynamical Systems*, 6(2): 93-113 (2000).

Gravouil, A., et al., "Multi-time-step explicit-implicit method for non-linear structural dynamics," *Int. J. Numer. Meth. Engang*, 50:199-225 (2001).

Amberg, J., et al., "Study on Efficiency and Robustness of Numerical Methods in Co-Simulation," INTEC GmbH, Friedrichshafener Strasse 1, D-82205 Gilching, Germany (Oct. 1, 2009).

\* cited by examiner

CO-SIMULATION PROCEDURES USING FULL DERIVATIVES OF OUTPUT VARIABLES

BACKGROUND OF THE INVENTION

The embodiments described herein relate generally to co-simulation methods for use with simulation of models of real-world objects and, more particularly, to using parallel execution of the methods during such simulations.

Science and engineering often require modeling of physical systems in order to solve problems. Models of the problems can then be solved without the need of constructing and, frequently, destroying, physical specimens. However, complex multi-disciplinary systems need to be broken up into multiple subsystem models, where the various sub-problems are examined and solved. The term "co-simulation" refers generally to an approach to simulating coupled technical systems. For example, in a master-slave system, one or more slave subsystems would simulate sub-problems while the master system coordinates the overall simulation and transfers data between slave subsystems. The slave subsystems can be "coupled" in order to communicate data during simulation at certain times.

At least some known processes for addressing co-simulation problems are based on establishing specific rules of transferring output variables, or some combinations of output variables, from one subsystem at a "rendezvous" or "communication" time to another subsystem as input variables, and vice versa at the same or previous time. The stability of such processes depends on how strong the coupling conditions are relative to the stiffness of the subsystems themselves. Typically, such processes require subsystems to be processed in a specific order. However, such a requirement requires knowledge of the numerical properties of the individual subsystems and coupling conditions. This prevents using a generic co-simulation procedure from being built and used to analyze different problems. Moreover, such a requirement can greatly reduce performance in analyzing the overall model because it does not enable a parallel co-simulation computational procedure.

Other, more advanced processes address the issues of stability and accuracy in co-simulation techniques by utilizing stabilized modular time integration approaches that can be applied to coupled differential algebraic equations. Such processes are based on the use of Jacobian matrices that correspond to algebraic equations between input and output variables. When algebraic loops are present in a system, known co-simulation processes may become computationally unstable. For example, this will happen if, for a pair of explicitly dependent input variables of a first subsystem and output variables of a second subsystem, input variables of the second subsystem also explicitly depend on the output variables of the first subsystem. Iterative processes for algebraic variables are sometimes used in such cases to improve stability.

For systems that do not include algebraic loops, non-iterative linearly implicit stabilization processes enable a specific chain of communication to be established between the increments of input and output variables at the communication time points. Linear implicit behavior for the output and state variables is often assumed between the communication points for each subsystem. However, this approach requires certain multiplications of Jacobian matrices, corresponding to specific subsystem integration schemes, to be communicated between co-simulated subsystems.

Furthermore, some known processes use a domain decomposition approach for solving problems in structural dynamics, for example. Such processes address co-simulation using condensed components of subsystem matrices that are exposed in the interfaces between subsystems. These matrices are constructed based on time integration equations for each subsystem.

The approaches described above use a modular approach that assumes communication of only the output and input variables and only at the communication points, which may lead to unstable co-simulation processes. Moreover, these approaches require investigation of the presence of algebraic loops in the algebraic system of input-output relationships. Furthermore, these approaches are dependent on the order in which the subsystems are processed and, consequently, prevent the co-simulation process from running in parallel.

BRIEF DESCRIPTION OF THE INVENTION

In one aspect, a computer-implemented method includes computing a Jacobian matrix based on output derivatives related to corresponding first input variables for each of a plurality of subsystems, modifying the first input variables, and computing second input variables and residuals for each of the plurality of subsystems based on corresponding state variable derivatives.

In another aspect, a computer includes a memory area and a processor coupled to the memory area. The memory area is configured to store a Jacobian matrix, output derivatives, first and second input variables for each of a plurality of subsystems, residuals for each of the plurality of subsystems, and state variable derivatives corresponding to the first input variables and residuals. The processor is configured to communicate with the memory area to compute the Jacobian matrix based on the output derivatives related to the corresponding first input variables for each of the plurality of subsystems, modify the first input variables, and compute the second input variables and the residuals for each of the plurality of subsystems based on the corresponding state variable derivatives.

In another aspect, a computer program product includes one or more non-transitory computer-readable storage media having computer-executable components thereon. The computer-executable components include a Jacobian matrix component that when executed by a processor causes the processor to compute a Jacobian matrix based on output derivatives related to corresponding first input variables for each of a plurality of subsystems. The components also include a modification component that when executed by a processor causes the processor to modify the first input variables, and a second derivative component that when executed by a processor causes the processor to compute second input variables and residuals for each of the plurality of subsystems based on corresponding state variable derivatives.

BRIEF DESCRIPTION OF THE DRAWINGS

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

Exemplary embodiments of systems, methods, apparatus (computers), and computer program products for use in simulating models of three-dimensional objects are described herein. The embodiments described herein facilitate simulating dynamic behavior of complex engineering systems, which are comprised of several subsystems and is often performed by a modular approach in which the global system is naturally decomposed into several subsystems. As a result of such approach each individual subsystem can be modeled and analyzed separately and even in parallel by means of exchange of information between different software components used to model each subsystem. The examples of such systems could be high precision tool machines or modern automobiles requiring the modeling of multiple components which may represent different engineering fields (different physics), e.g. mechanics, controls, electronics, hydraulics, etc. More specifically, the embodiments described herein facilitate communicating proper components of full Jacobian matrices. These Jacobian matrices include partial derivatives of output variables with respect to inputs, thereby representing direct output-to-input dependency. Moreover, the Jacobian matrices include derivatives related to output-to-input dependency via state variables, thereby representing indirect output-to-input dependency. Further, the embodiments described herein eliminate the need to inspect for the presence of algebraic loops and provide an enhanced global system Jacobian matrix that can be used to update input increments. In addition, the embodiments described herein facilitate parallel time integration of individual subsystems, thereby enhancing performance in the overall simulation and analysis of a model.

Figure 1:
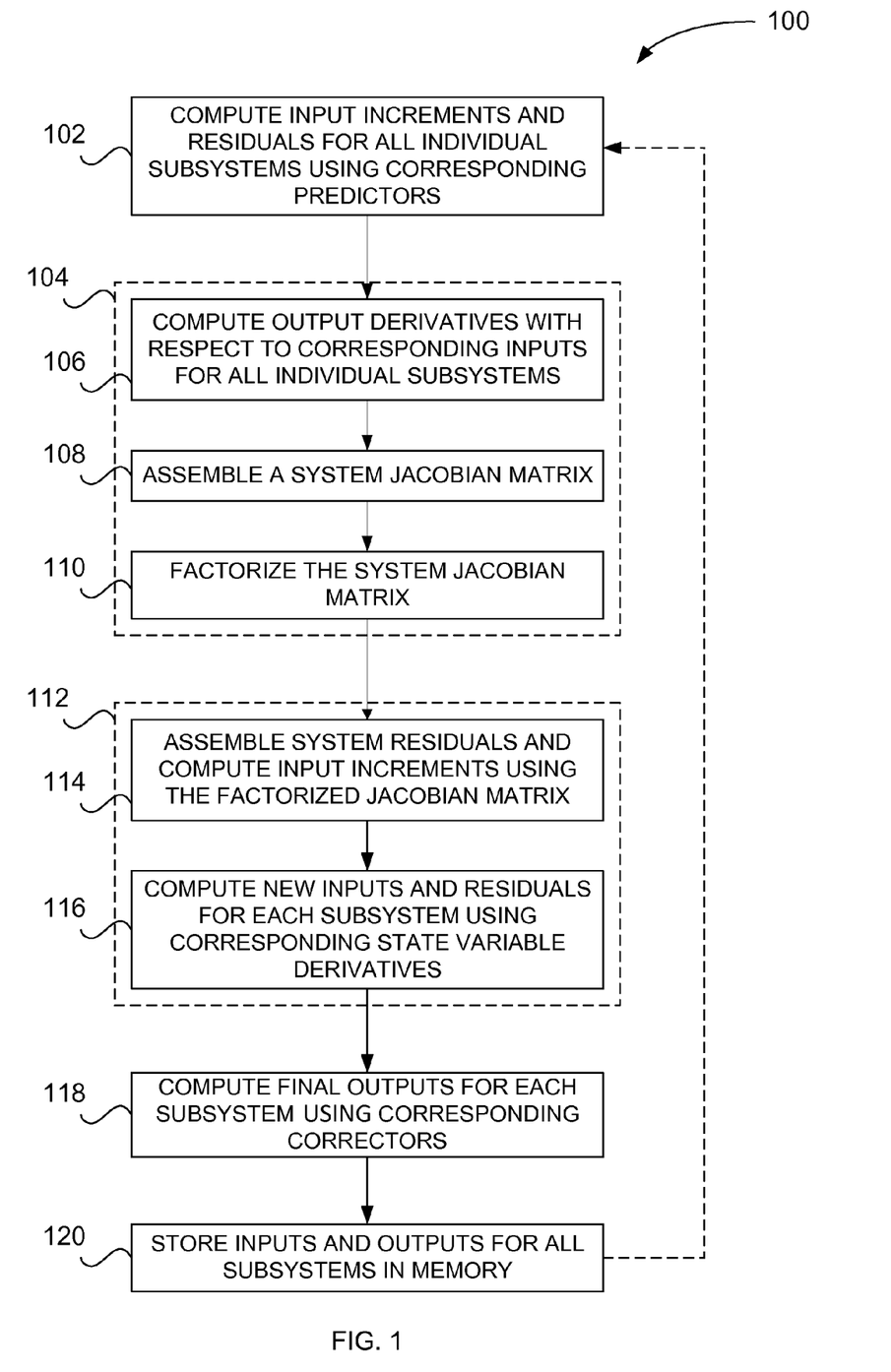
FIG. 1 is a flowchart that illustrates an exemplary computer-implemented method for use in simulating a model of a physical object.

FIG. 1 is a flowchart 100 that illustrates an exemplary computer-implemented method for use in simulating dynamic behavior of complex engineering systems comprised of several subsystems. As described above, a co-simulation process is one in which several time-dependent simulations proceed independently between "rendezvous" or "communication" time points $t_n$ for $n=0, 1, \ldots n_f$, where $n_f$ is the total number of co-simulation steps. At each communication point, an exchange of information occurs between individual subsystem simulations. The entire co-simulation process proceeds from the initial time $t_{start}=t_0$ to the end time $t_{finish}=t_{n_f}$. Consequently, in some embodiments, there is no data exchange between the individual subsystem simulations at any point between $t_n$ and $t_{n+1}$. However, in such embodiments, it is not assumed that the co-simulation time steps between $\Delta t_{n+1}=t_{n+1}-t_n$ are the same. Moreover, in some embodiments, the behavior of each individual subsystem simulation is described by an ordinary differential equation as shown in Equations (1) and (2):

$$\dot{x}^i(t)=f^i(x^i(t),u^i(t)) \quad \text{Eq. (1)}$$

$$y^i(t)=g^i(x^i(t),u^i(t)), i=1,\ldots,r \quad \text{Eq. (2)}$$

where $\dot{x}^i t$ represents state variables of the i-th subsystem; $u^i$ and $y^i$ represent input and output variables for the same subsystem, respectively; and $r \geq 2$ is the number of subsystem in the co-simulation process.

Coupling two or more subsystems is governed by linear or non-linear algebraic input-output relationships, as shown in Equation (3):

$$u^i(t)=z^i(y^j(t),j=1,\ldots,r,j\neq i),i=1,\ldots,r \quad \text{Eq. (3)}$$

For example, for the case of two subsystems, a coupling equation could be written as shown in Equation (4):

$$u^1(t)=y^2(t); u^2(t)=y^1(t) \quad \text{Eq. (4)}$$

Assuming that all of the inputs are linear between the communication points leads to Equation (5):

$$u^i(t)=\frac{u_n^i \cdot (t_{n+1}-t)+u_{n+1}^i \cdot (t-t_n)}{t_{n+1}-t_n} \quad \text{Eq. (5)}$$

where state and output variables for all individual subsystems at the time $t_{n+1}$ may be approximated as shown in Equation (6):

$$x_{n+1}^i=F^i(x_n^i,u_n^i,u_{n+1}^i), \quad \text{Eq. (6)}$$

$$y_{n+1}^i=g^i(F^i(x_n^i,u_n^i,u_{n+1}^i),u_{n+1}^i)$$

Notably, the variables $x_n^i$ and $u_n^i$ are always available at the beginning of each co-simulation time step. When an approximation of input variables at the end of this step $\bar{u}_{n+1}^i$ is known, an increment of the input variables $\Delta u_{n+1}^i$ is determined from the solution of the system of linear equations, as shown in Equation (7):

$$J\Delta u_{n+1}=h \quad \text{Eq. (7)}$$

where J is a full-coupled Jacobian matrix of the input-output relation, and as expressed in Equation (8):

$$J = \begin{bmatrix} I & -\frac{\partial z^1}{\partial y^2}\left(\frac{\partial g^2}{\partial x^2}\frac{\partial F^2}{\partial x^2}+\frac{\partial g^2}{\partial u^2}\right) & \cdots & -\frac{\partial z^1}{\partial y^{r-1}}\left(\frac{\partial g^{r-1}}{\partial x^{r-1}}\frac{\partial F^{r-1}}{\partial u^{r-1}}+\frac{\partial g^{r-1}}{\partial u^{r-1}}\right) & -\frac{\partial z^1}{\partial y^r}\left(\frac{\partial g^r}{\partial x^r}\frac{\partial F^r}{\partial u^r}+\frac{\partial g^r}{\partial u^r}\right) \\ -\frac{\partial z^2}{\partial y^1}\left(\frac{\partial g^1}{\partial x^1}\frac{\partial F^1}{\partial u^1}+\frac{\partial g^1}{\partial u^1}\right) & I & \cdots & -\frac{\partial z^2}{\partial y^{r-1}}\left(\frac{\partial g^{r-1}}{\partial x^{r-1}}\frac{\partial F^{r-1}}{\partial u^{r-1}}+\frac{\partial g^{r-1}}{\partial u^{r-1}}\right) & -\frac{\partial z^2}{\partial y^r}\left(\frac{\partial g^r}{\partial x^r}\frac{\partial F^r}{\partial u^r}+\frac{\partial g^r}{\partial u^r}\right) \\ \cdots & \cdots & \cdots & \cdots & \cdots \\ -\frac{\partial z^{r-1}}{\partial y^1}\left(\frac{\partial g^1}{\partial x^1}\frac{\partial F^1}{\partial u^1}+\frac{\partial g^1}{\partial u^1}\right) & -\frac{\partial z^{r-1}}{\partial y^2}\left(\frac{\partial g^2}{\partial x^2}\frac{\partial F^2}{\partial u^2}+\frac{\partial g^2}{\partial u^2}\right) & \cdots & I & -\frac{\partial z^{r-1}}{\partial y^r}\left(\frac{\partial g^r}{\partial x^r}\frac{\partial F^r}{\partial u^r}+\frac{\partial g^r}{\partial u^r}\right) \\ -\frac{\partial z^r}{\partial y^1}\left(\frac{\partial g^1}{\partial x^1}\frac{\partial F^1}{\partial u^1}+\frac{\partial g^1}{\partial u^1}\right) & -\frac{\partial z^r}{\partial y^2}\left(\frac{\partial g^2}{\partial x^2}\frac{\partial F^2}{\partial u^2}+\frac{\partial g^2}{\partial u^2}\right) & \cdots & -\frac{\partial z^r}{\partial y^{r-1}}\left(\frac{\partial g^{r-1}}{\partial x^{r-1}}\frac{\partial F^{r-1}}{\partial u^{r-1}}+\frac{\partial g^{r-1}}{\partial u^{r-1}}\right) & I \end{bmatrix} \quad \text{Eq. (8)}$$

Here h is the current residual of the input-output relationship, as expressed in Equation (9):

$$h = \begin{bmatrix} z^1(g^j(F^j(x_n^j,u_n^j,\bar{u}_{n+1}^j),\bar{u}_{n+1}^j), j\neq 1)-\bar{u}_{n+1}^1 \\ z^2(g^j(F^j(x_n^j,u_n^j,\bar{u}_{n+1}^j),\bar{u}_{n+1}^j), j\neq 2)-\bar{u}_{n+1}^2 \\ \cdots \\ z^{r-1}(g^j(F^j(x_n^j,u_n^j,\bar{u}_{n+1}^j),\bar{u}_{n+1}^j), j\neq r-1)-\bar{u}_{n+1}^{r-1} \\ z^r(g^j(F^j(x_n^j,u_n^j,\bar{u}_{n+1}^j),\bar{u}_{n+1}^j), j\neq r)-\bar{u}_{n+1}^r \end{bmatrix}; \quad \text{Eq. (9)}$$

$$\Delta u_{n+1} = \begin{bmatrix} \Delta u_{n+1}^1 \\ \Delta u_{n+1}^2 \\ \ldots \\ \Delta u_{n+1}^{r-1} \\ \Delta u_{n+1}^r \end{bmatrix}$$

Based on the above equations, it should be apparent that each individual subsystem simulation j supplies a full derivative of its own output with respect to its inputs $$\frac{dg^j}{du^j} = \frac{\partial g^j}{\partial x^j}\frac{\partial F^j}{\partial u^j} + \frac{\partial g^j}{\partial u^j},$$

which include contributions from corresponding derivatives of state variables and are computed at the beginning of a respective co-simulation step.

The $$\frac{\partial F^j}{\partial u^j}$$

value can be approximated in a number of ways. Two will be described here but one of skill in the art will understand that other methods may be used. The two described herein rely on applying methods of approximating derivatives.

The first method of approximating $$\frac{\partial F^j}{\partial u^j}$$

is to use divided differences as shown in Equation (10):

$$\frac{\partial F^j}{\partial u^j} \approx \begin{bmatrix} \frac{F^j(x_n^j, u_n^j, \overline{u}_{n+1}^j + \varepsilon e_1) - F^j(x_n^j, u_n^j, \overline{u}_{n+1}^j)}{\varepsilon} \\ \frac{F^j(x_n^j, u_n^j, \overline{u}_n^j + \varepsilon e_2) - F^j(x_n^j, u_n^j, \overline{u}_{n+1}^j)}{\varepsilon} \\ \vdots \end{bmatrix}^T \qquad \text{Eq. (10)}$$

where $\varepsilon$ is a suitably small number and $e_m$ is the m-th unit-vector. The column dimension of each matrix $$\frac{\partial F^j}{\partial u^j}$$

is equal to the dimension of corresponding vector of input variables $u^j$.

The second method of approximating $$\frac{\partial F^j}{\partial u^j}$$

is to use a Padé-approximation of a matrix-exponential for the linearized system. Specifically, a (2,1)-Padé approximation results in Equation (11):

$$\frac{\partial F^j}{\partial u^j} \approx \frac{1}{2}\left(I \cdot \frac{1}{t_{n+1} - t_n} - \frac{\partial f^j(x_n^j, u_n^j)}{\partial x_n^j} \cdot \frac{1}{3}\right)^{-1} \frac{\partial f^j(x_n^j, u_n^j)}{\partial u_n^j} \qquad \text{Eq. (11)}$$

It should be understood that a higher order Padé-approximation may also be used. This approximation can be computed directly or may alternatively be combined with the simulation of subsystem j since implicit integration methods for each subsystem are also approximate $$\frac{\partial f^j(x_n^j, u_n^j)}{\partial x_n^j}.$$

Moreover, some embodiments transform this matrix to Hessenberg form to handle subsystem integration with varying step-sizes more efficiently, which enhances speed in solving $$\left(I \cdot \alpha - \frac{\partial f^j(x_n^j, u_n^j)}{\partial x_n^j} \cdot \beta\right)^{-1}$$

$\gamma$ for an arbitrary matrix $\gamma$ and arbitrary non-zero scalars $\alpha$, $\beta$.

One advantage of the embodiments described herein is the use of these derivatives, which are completely independent of each other, and are computed in parallel by each individual subsystem simulation process. State variables, derivatives of the state variables, and the algorithm used by each individual subsystem simulation process to perform integration between communication points remain completely internal or localized within each process and are not visible to other subsystem simulation processes or to the global or master co-simulation driver. The only visible quantity provided by each subsystem simulation process, and which quantity is necessary to compute the Jacobian matrix, is a full derivative of the subsystem simulation process output with respect to an input computed for predicted values of input variables at the end of each current co-simulation time increment. The global Jacobian matrix is assembled, or computed, using partial derivatives of each input as a function of all other outputs in the coupling equation, which is typically represented by an algebraic expression, and by the individual output derivatives.

Moreover, final values of all input variables for all subsystem simulation processes at the end of a given co-simulation time increment $t_{n+1}$ are determined as a result of an iterative process. On each iteration k, input increments are determined as a solution of the system of linear equations presented above. Typically, a Jacobian matrix is computed and factorized only once per each co-simulation time increment, while the global residual vector is recomputed at each iteration based on the updated input variables in Equation (12):

$$u_{n+1,k+1}^i = u_{n+1,k}^i + \Delta u_{n+1,k}^i, i=1,2,\ldots,r \qquad \text{Eq. (12)}$$

In an exemplary embodiment, the initial approximation of the global residual vector is determined for each subsystem process using a predictor. One predictor is expressed in Equation (13):

$$u_{n+1,1}^i = u_n^i, i=1,2,\ldots,r \qquad \text{Eq. (13)}$$

In some embodiments, only a single iteration is performed to determine the input increments for all of the individual subsystem simulation processes. However, in the exemplary embodiment, several nonlinear iterations are performed to facilitate enhanced accuracy without sacrificing performance.

Another advantage of the embodiments described herein is that there is no time integration process within each individual subsystem simulation process for the residual computations. Rather, the derivatives of individual state variables with respect to corresponding inputs $$\frac{\partial F^i}{\partial u^i}$$

are computed and stored by each individual subsystem simulation process. Accordingly, updated state variables and output variables are approximated based on Equation (14):

$$x_{n+1,k+1}^j = \qquad \text{Eq. (14)}$$
$$F^i(x_n^j, u_n^j, u_{n+1,k+1}^j) \cong F^i(x_n^j, u_n^j, u_{n+1,k}^j) + \frac{\partial F^i}{\partial u^i}\Delta u_{n+1,k}^i =$$
$$x_{n+1,k}^j + \frac{\partial F^i}{\partial u^i}\Delta u_{n+1,k}^i, i = 1, 2, \ldots, r$$

In an exemplary embodiment, Equation (14) is more efficiently computed based on the exact solution of the ordinary differential equation shown in Equation (15):

$$\Delta \dot{x}^i(t) = \frac{\partial F^i}{\partial x^i}\Delta x^i(t) + \frac{\partial F^i}{\partial u^i}\dot{u}^i(t-t_n), \qquad \text{Eq. (15)}$$
$$t_n \le t \le t_{n+1}, \Delta x^i(t_n) = 0, \dot{u}^i = \frac{\Delta u_{n+1}^j}{t_{n+1} - t_n}$$

Notably, Equation (15) leads to a different solution than one that is obtained under an assumption of linear behavior of state variables between neighboring communication time points.

After the iterative process for the nonlinear system of input-output relations is complete, the final values of input variables $u_{n+1}^i$, i=1, 2, . . . , r are determined, and the corrector integration for each individual subsystem simulation process is computed to complete the integration process for a given co-simulation time increment. These calculations are independent of each other and, therefore, can be performed in parallel. The calculations are shown in Equations (16) and (17):

$$x_{n+1}^i = F^i(x_n^i, u_n^i, u_{n+1}^i) \qquad \text{Eq. (16)}$$

$$y_{n+1}^i = g^i(F^i(x_n^i, u_n^i, u_{n+1}^i), u_{n+1}^i) \qquad \text{Eq. (17)}$$

Referring now to FIG. 1, the process steps are shown for a single co-simulation time increment across a plurality of simulation subsystems. As used herein, the term "predictor" refers to an independent variable that represents a value being manipulated or changed. A predictor-corrector method proceeds in two steps. First, the prediction step calculates a rough approximation of the desired quantity. Second, the corrector step refines the initial approximation using another means. In an exemplary embodiment, a single co-simulation increment begins by computing 102 input increments and a first set of residuals for all subsystems using corresponding predictors. A Jacobian matrix is then computed 104 based on output derivatives related to a corresponding first set of input variables for each of the subsystems. More specifically, output derivatives related to the corresponding first set of input variables are computed 106 for each of the subsystems, the Jacobian matrix is assembled 108, and the Jacobian matrix is then factorized 110.

In an exemplary embodiment, the Jacobian matrix is used to modify 112 the input variables. More specifically, the residuals are assembled 114 and input increments are computed based on the factorized Jacobian matrix. A second set of input variables and a second set of residuals are then computed 116 for each of the subsystems based on corresponding state variable derivatives. Final outputs are computed 118 for each of the subsystems based on corresponding correctors, and relevant data is stored 120 in a memory area. If subsequent time increments are necessary when $t_{n+1} < t_{finish}$, the process begins again with computation 102 of input increments and residuals for all subsystems using corresponding predictors on the subsequent time step.

Figure 2:
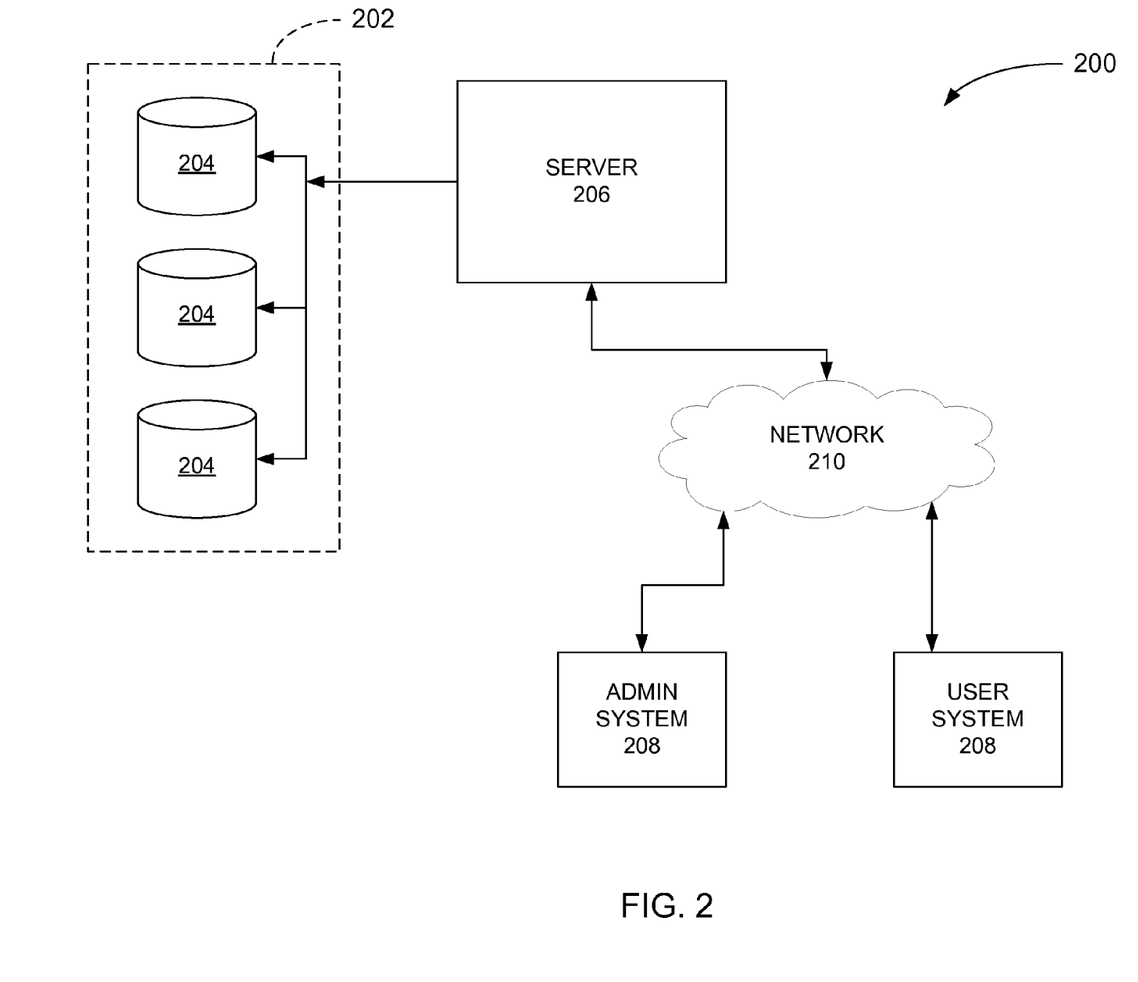
FIG. 2 is a schematic block diagram of an exemplary computer network for use with the method shown in FIG. 1.

FIG. 2 is a schematic block diagram of an exemplary computer network 200 for use in simulating dynamic behavior of complex engineering systems comprised of several subsystems, and/or for use in performing the processes described above and/or additional processes that may be related to those described above. In an exemplary embodiment, a memory area 202 includes one or more storage devices 204 for use in storing data, such as input increments, residuals, predictors, output derivatives, one or more Jacobian matrices, state variable derivatives, final system outputs, correctors, or any other suitable data. In some embodiments, the memory area 202 is coupled to a server system 206, which is in turn coupled to client systems 208 such as an administrator system and/or a user system, via a network 210. The storage devices 204 may be embodied as one or more databases, may be located at a single or at multiple geographical sites, or may be integrated with the server system 206.

As can be appreciated, the network 210 can be a public network, such as the Internet, or a private network such as an LAN or WAN network, or any combination thereof and can also include PSTN or ISDN sub-networks. The network 210 can also be wired, such as an Ethernet network, or can be wireless such as a cellular network including EDGE, 3G, and 4G wireless cellular systems. The wireless network can also be WiFi, Bluetooth, or any other wireless form of communication that is known. Thus, the network 210 is merely exemplary and in no way limits the scope of the present advancements.

The client systems 208 can be any suitable computer architecture such as the one described below with reference to FIG. 3, or any other computing architecture that is known. Moreover, it should be understood that the server system 206 is configured to perform the processes described above and/or any additional processes that may be related to those described above.

The server system 206 stores the computer-readable instructions to execute the processes described above, and provides these instructions via the network 210 to the client systems 208. Moreover, the server system 206 can also provide data from the memory area 202 as needed to the client systems 208 such that the client systems 208 execute the processes described above. As such, FIG. 2 includes implementations of the computer system 200 via cloud computing, distributed computing, and the like.

During operation, the server system 206 and the client systems 208 interact to perform the steps described above in FIG. 1. For example, the server system 206 performs operations within a single co-simulation increment by computing input increments and a first set of residuals for all subsystems using corresponding predictors. The server system 206 then computes a Jacobian matrix based on output derivatives related to a corresponding first set of input variables for each of the subsystems. More specifically, output derivatives related to the corresponding first set of input variables are computed on the basis of corresponding state variable derivatives for each of the subsystems, the Jacobian matrix is assembled, and the Jacobian matrix is then factorized. Moreover, in an exemplary embodiment, the server system 206 uses the factorized Jacobian matrix to modify the first set of input variables. More specifically, the first set of residuals is assembled and input increments are computed based on the factorized Jacobian matrix. The server system 206 then computes a second set of input variables and a second set of residuals for each of the subsystems based on corresponding state variable derivatives. The server system 206 also computes final outputs for each of the subsystems based on corresponding correctors, and stores the data in memory area 202. The server system 206 may also transmit the final outputs and/or the data to one or more client systems 208 for display to a user.

Figure 3:
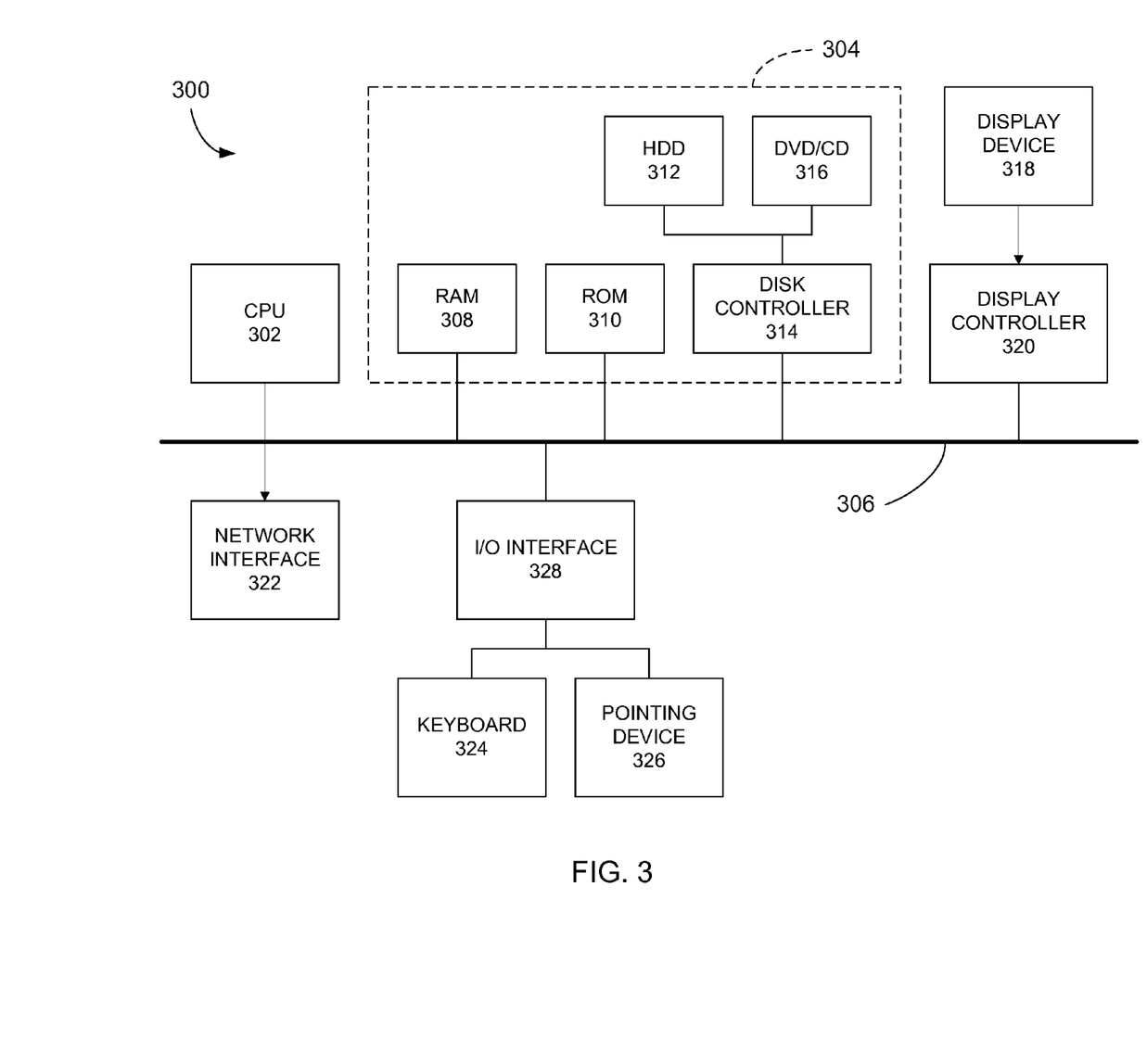
FIG. 3 is a schematic block diagram of an exemplary computer architecture for use with the method shown in FIG. 1.

FIG. 3 is a schematic block diagram of an exemplary computer architecture 300 for use with the server system 206 and/or the client systems 208 (each shown in FIG. 2).

In an exemplary embodiment, the computer architecture 300 includes one or more processors 302 (CPU) that performs the processes described above and/or any additional processes that may be related to those described above. It should be understood that the term "processor" refers generally to any programmable system including systems and microcontrollers, reduced instruction set circuits (RISC), application-specific integrated circuits (ASIC), programmable logic circuits, and/or any other circuit or processor capable of executing the functions described herein. The above examples are exemplary only and, thus, are not intended to limit in any way the definition and/or meaning of the term "processor."

The steps of the processes described above and/or any additional processes that may be related to those described above may be stored as computer-executable instructions in, for example, a memory area 304 that is operably and/or communicatively coupled to the processor 302 by a system bus 306. A "memory area," as used herein, refers generally to any means of storing non-transitory program code and instructions executable by one or more processors to aid in simulating dynamic behavior of complex engineering systems comprised of several subsystems, and/or for use in performing the processes described above and/or additional processes that may be related to those described above. The memory area 304 may include one, or more than one, forms of memory. For example, the memory area 304 may include random-access memory (RAM) 308, which can include non-volatile RAM, magnetic RAM, ferroelectric RAM, and/or other forms of RAM. The memory area 304 may also include read-only memory (ROM) 310 and/or flash memory and/or electrically-programmable read-only memory (EEPROM). Any other suitable magnetic, optical, and/or semiconductor memory, such as a hard-disk drive (HDD) 312, by itself or in combination with other forms of memory, may be included in the memory area 304. The HDD 312 may also be coupled to a disk controller 314 for use in transmitting and receiving messages to and from the processor 302. Moreover, the memory area 304 may also be, or may include, a detachable or removable memory 316, such as a suitable cartridge disk, CD-ROM, DVD, or USB memory. The above examples are exemplary only and, thus, are not intended to limit in any way the definition and/or meaning of the term "memory area."

The computer architecture 300 also includes a display device 318 that is coupled, such as operatively coupled, to a display controller 320. The display controller 320 receives data via the system bus 306 for display by the display device 318. The display device 318 may be, without limitation, a monitor, a television display, a plasma display, a liquid crystal display (LCD), a display based on light-emitting diodes (LED), a display based on organic LEDs (OLED), a display based on polymer LEDs, a display based on surface-conduction electron emitters, a display including a projected and/or reflected image, or any other suitable electronic device or display mechanism. Moreover, the display device 318 may include a touchscreen with an associated touchscreen controller 320. The above examples are exemplary only and, thus, are not intended to limit in any way the definition and/or meaning of the term "display device."

In addition, the computer architecture 300 includes a network interface 322 for use in communicating with a network (not shown in FIG. 3). Moreover, the computer architecture 300 includes one or more input devices, such as a keyboard 324 and/or a pointing device 326, such as a roller ball, mouse, touchpad, and the like. The input devices are coupled to and controlled by an input/output (I/O) interface 328, which is further coupled to the system bus 306.

A description of the general features and functionality of the display device 318, keyboard 324, pointing device 326, as well as the display controller 320, disk controller 314, network interface 322, and I/O interface 328 is omitted herein for brevity as these features are known.

During operation, the processor 302 performs the steps described above in FIG. 1. For example, the processor 302 performs operations within a single co-simulation increment by computing input increments and a first set of residuals for all subsystems using corresponding predictors. The processor 302 then computes a Jacobian matrix based on output derivatives related to a corresponding first set of input variables for each of the subsystems. More specifically, output derivatives related to the corresponding first set of input variables are computed on the basis of corresponding state variables derivatives for each of the subsystems, the Jacobian matrix is assembled, and the Jacobian matrix is then factorized. Moreover, in an exemplary embodiment, the processor 302 uses the factorized Jacobian matrix to modify the first set of input variables. More specifically, the first set of residuals is assembled and input increments are computed based on the factorized Jacobian matrix. The processor 302 then computes a second set of input variables and a second set of residuals for each of the subsystems based on corresponding state variable derivatives. The processor 302 also computes final outputs for each of the subsystems based on corresponding correctors, and stores the data in memory area 304. The processor 302 may also transmit the final outputs and/or the data to the display controller 320 for display to a user via the display device 318.

Exemplary embodiments of methods, systems, apparatuses, and computer program products for use in simulating dynamic behavior of complex engineering systems comprised of several subsystems are described above in detail. The methods, systems, apparatuses, and computer program products are not limited to the specific embodiments described herein but, rather, some operations of the methods and/or components of the system and/or apparatus may be utilized independently and separately from other operations and/or components described herein. However, in some embodiments, the above-described sequence of operations of the methods and/or use of the components of the system and/or apparatus is necessary for correct operation. Further, the described operations and/or components may also be defined in, or used in combination with, other systems, methods, and/or apparatus, and are not limited to practice with only the systems, methods, and storage media as described herein.

Client computers and servers, such as those described herein, includes at least one processor or processing unit and a system memory. The client computers and servers typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary simulation system environment, embodiments of the invention are operational with numerous other general purpose or special purpose simulation system environments or configurations. The simulation system environment is not intended to suggest any limitation as to the scope of use or functionality of any aspect of the invention. Moreover, the simulation system environment should not be interpreted as having any dependency or requirement relating to any one or combination of components illustrated in the exemplary operating environment. Examples of well known simulation systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

An exemplary computer program product includes, for example, one or more non-transitory computer-readable storage media having computer-executable components thereon. The computer-executable components include a Jacobian matrix component that when executed by a processor, such as processor 302 (shown in FIG. 3) or a processor of server system 206 (shown in FIG. 2) causes the processor to compute a Jacobian matrix based on output derivatives related to corresponding input variables from a first set of input variables for each of a plurality of subsystems of a master system that represents the physical object. In some embodiments, the Jacobian matrix component further causes the processor to factorize the Jacobian matrix. Moreover, in some embodiments, the Jacobian matrix component further causes the processor to assemble a first set of residuals and compute input increments based on the factorized Jacobian matrix in order to compute a second set of input variables.

In an exemplary embodiment, the computer-executable components also include a modification component that causes the processor to modify the first set of input variables. Moreover, in an exemplary embodiment, the computer-executable components include a second derivative component that causes the processor to compute the second set of input variables and a second set of residuals for each of the plurality of subsystems based on corresponding state variable derivatives. In some embodiments, and when the residuals are a second set of residuals, the second derivative component causes the processor to compute input increments and a first set of residuals for each of the plurality of subsystems based on corresponding predictors.

In some embodiments, the computer-executable components also include a first derivative component that causes the processor to compute the output derivatives related to the corresponding first set of input variables for each of the plurality of subsystems to facilitate computing the Jacobian matrix. Moreover, in some embodiments, the computer-executable components include an output component that causes the processor to compute outputs for each of the plurality of subsystems based on corresponding correctors. In some such embodiments, the output component also causes the processor to store in a memory area one or more of the Jacobian matrix, the output derivatives, the first input variables, the second input variables, the residuals, and the outputs.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for use in simulating dynamic behavior of a complex engineering system, said computer-implemented method comprising:

by a processor and associated memory:
modeling an engineering system to simulate dynamic behavior of the engineering system, wherein the modeling includes decomposing the engineering system into a plurality of subsystem models such that each subsystem model, in parallel, simulates dynamic behavior of a respective subsystem of the engineering system;
providing an integration process for communicating data between the plurality of subsystem models to simulate the dynamic behavior of the engineering system, the integration process uses dynamic behavior simulation equations over finite time increments to compute derivatives of a global Jacobian matrix for the modeled engineering system, wherein the global Jacobian matrix represents output-to-input dependencies between the plurality of subsystem models of the modeled engineering system;
computing, by the integration process, the global Jacobian matrix based on independent, full output derivatives for each of the plurality of subsystem models, wherein the output derivatives for each respective subsystem model are full derivatives of output variables of the respective subsystem model computed based on: (i) corresponding state variable derivatives related to corresponding first input variables for the respective subsystem model, such that the subsystem model provides a full derivative as output, the full derivative computed with respect to derivatives of the first input variables and including contributions from the state variable derivatives, and (ii) time increments between communication points for the respective subsystem model, and wherein the output derivatives for each respective subsystem model are computed in parallel;
modifying the first input variables;
computing second input variables and residuals for each respective subsystem model based on the corresponding state variable derivatives for the respective subsystem model; and
enabling simulation of the dynamic behavior of the engineering system by using in the simulation the computed second input variables and residuals of respective subsystem models, wherein state variable derivatives used by a respective subsystem model simulation process to perform integration between communication points remain localized within the subsystem model simulation process and are not visible to other subsystem model simulation processes.

2. A computer-implemented method in accordance with claim 1, wherein the residuals are second residuals, said computer-implemented method further comprising computing input increments and first residuals for each of the plurality of subsystem models based on corresponding predictors.

3. A computer-implemented method in accordance with claim 1, wherein computing a Jacobian matrix comprises computing the output derivatives based on the corresponding state variable derivatives related to the corresponding first input variables for each of the plurality of subsystem models.

4. A computer-implemented method in accordance with claim 1, wherein computing a Jacobian matrix comprises factorizing the Jacobian matrix.

5. A computer-implemented method in accordance with claim 4, wherein computing second input variables comprises:
assembling the residuals; and
computing input increments based on the factorized Jacobian matrix.

6. A computer-implemented method in accordance with claim 1, further comprising computing outputs for each of the plurality of subsystem models based on corresponding correctors.

7. A computer comprising:
a memory area configured to store a global Jacobian matrix for a model of a complex engineering system, independent, full output derivatives for each of a plurality of subsystem models of the modeled engineering system, first and second input variables for each of the plurality of subsystem models, residuals for each of the plurality of subsystem models, time increments between communication points for each of the plurality of subsystem models, and state variable derivatives corresponding to the first input variables and residuals; and
a processor coupled to said memory area, said processor configured to:
model the engineering system to simulate dynamic behavior of the engineering system, wherein the modeling includes decomposing the engineering system into the plurality of subsystem models such that each subsystem model, in parallel, simulates dynamic behavior of a respective subsystem of the engineering system;
provide an integration process for communicating data between the plurality of subsystem models to simulate the dynamic behavior of the engineering system, the integration process use dynamic behavior simulation equations over finite time increments to compute derivatives of the global Jacobian matrix, wherein the global Jacobian matrix represents output-to-input dependencies between the plurality of subsystem models of the modeled engineering system;
compute the global Jacobian matrix based on the output derivatives, the integration process computes the global Jacobian matrix based on the independent, full output derivatives for each of the plurality of subsystem models, wherein the output derivatives for each respective subsystem model are full derivatives of output variables of the respective subsystem model computed based on: (i) corresponding state variable derivatives related to the corresponding first input variables for the respective subsystem model, such that the subsystem model provides a full derivative as output, the full derivative computed with respect to derivatives of the first input variables and including contributions from the state variable derivatives, and (ii) time increments between communication points for respective subsystem model, and wherein the output derivatives for each respective subsystem model are computed in parallel;
modify the first input variables;
compute the second input variables and the residuals for each respective subsystem model based on the corresponding state variable derivatives for the respective subsystem model; and
simulate dynamic behavior of the engineering system using the computed second input variables and residuals of the respective subsystem models, wherein state variable derivatives used by a respective subsystem model simulation process to perform integration between communication points remain localized within the subsystem model simulation process and are not visible to other subsystem model simulation processes.

8. A computer in accordance with claim 7, wherein the residuals are second residuals, said processor further configured to compute input increments and first residuals for each of the plurality of subsystem models based on corresponding predictors.

9. A computer in accordance with claim 7, wherein said processor is further configured to compute the output derivatives related to the corresponding first input variables for each of the plurality of subsystem models to compute the Jacobian matrix.

10. A computer in accordance with claim 7, wherein said processor is further configured to factorize the Jacobian matrix.

11. A computer in accordance with claim 10, wherein said processor is further configured to:
assemble the residuals; and
compute input increments based on the factorized Jacobian matrix to compute the second input variables.

12. A computer in accordance with claim 7, wherein said processor is further configured to compute outputs for each of the plurality of subsystem models based on corresponding correctors.

13. A computer in accordance with claim 12, wherein said memory area is further configured to store the outputs.

14. A computer program product comprising:
one or more non-transitory computer-readable storage media having computer-executable components thereon, said computer-executable components comprising:
a model of an engineering system simulating dynamic behavior of the engineering system, wherein the model includes decomposing the engineering system into a plurality of subsystem models such that each subsystem model, in parallel, simulates dynamic behavior of a respective subsystem of the engineering system;
an integration process for communicating data between the plurality of subsystem models to simulate the dynamic behavior of the engineering system, the integration process uses dynamic behavior simulation equations over finite time increments to compute derivatives of a global Jacobian matrix for the model of the engineering system, wherein the global Jacobian matrix represents output-to-input dependencies between the plurality of subsystem models of the modeled engineering system;
a global Jacobian matrix component for the model of the engineering system that when executed by a processor causes the processor to compute the global Jacobian matrix based on independent, full output derivatives for each of a plurality of subsystem models of the model of the engineering system, wherein the output derivatives for each respective subsystem model are full derivatives of output variables of the respective subsystem model computed based on: (i) corresponding state variable derivatives related to corresponding first input variables for the respective subsystem model, such that the subsystem model provides a full derivative as output, the full derivative computed with respect to derivatives of the first input variables and including contributions from the state variable derivatives, and (ii) time increments between communication points for the respective subsystem model, and wherein the output derivatives for each respective subsystem model are computed in parallel;
a modification component that when executed by a processor causes the processor to modify the first input variables; and
a second derivative component that when executed by a processor causes the processor to compute second input variables and residuals for each respective subsystem model based on the corresponding state variable derivatives for the respective subsystem model, wherein output of the second derivative component provides to a simulator the computed second input variables and residuals for respective subsystem models, such that the simulator simulates dynamic behavior of the engineering system using the computed second input variables and residuals of respective subsystem models, wherein state variable derivatives used by a respective subsystem model simulation process to perform integration between communication points remain localized within the subsystem model simulation process and are not visible to other subsystem model simulation processes.

15. A computer program product in accordance with claim 14, wherein the residuals are second residuals, said second derivative component further causes the processor to compute input increments and first residuals for each of the plurality of subsystem models based on corresponding predictors.

16. A computer program product in accordance with claim 14, wherein said computer-executable components further comprise a first derivative component that when executed by a processor causes the processor to compute the output derivatives related to the corresponding first input variables for each of the plurality of subsystem models to facilitate computing the Jacobian matrix.

17. A computer program product in accordance with claim 14, wherein said Jacobian matrix component further causes the processor to factorize the Jacobian matrix.

18. A computer program product in accordance with claim 17, wherein said Jacobian matrix component further causes the processor to:
assemble the residuals; and
compute input increments based on the factorized Jacobian matrix to compute the second input variables.

19. A computer program product in accordance with claim 14, wherein said computer-executable components further comprise an output component that when executed by a processor causes the processor to compute outputs for each of the plurality of subsystem models based on corresponding correctors.

20. A computer program product in accordance with claim 19, wherein said output component further causes the processor to store in a memory area one or more of the Jacobian matrix, the output derivatives, the first input variables, the second input variables, the residuals, and the outputs.

* * * * *